United States Patent
Green

(10) Patent No.: US 6,776,525 B1
(45) Date of Patent: Aug. 17, 2004

(54) GEL COVERED DENTAL FILM

(76) Inventor: Frances M. Green, 2530 NW. 155 Ter., Opulocka, FL (US) 33054

(*) Notice: Subject to any disclaimer, the term of this patent is extended or adjusted under 35 U.S.C. 154(b) by 113 days.

(21) Appl. No.: 10/265,484

(22) Filed: Oct. 7, 2002

(51) Int. Cl.[7] .............................. A61B 6/14; G03B 42/02
(52) U.S. Cl. ........................ 378/168; 378/169; 378/170
(58) Field of Search ................................ 378/167, 168, 378/169, 170, 177, 191

(56) References Cited

U.S. PATENT DOCUMENTS

| | | |
|---|---|---|
| 4,922,511 A | 5/1990 | Gay |
| 5,202,707 A | 4/1993 | Halbridge |
| 5,289,522 A * | 2/1994 | Kanbar et al. ............... 378/170 |
| 5,677,537 A * | 10/1997 | Pfeiffer ................... 250/370.09 |
| D415,566 S | 10/1999 | Joyner |
| 6,231,957 B1 | 5/2001 | Zerbe et al. |
| 6,382,831 B1 * | 5/2002 | Bacchetta et al. .......... 378/170 |
| 6,641,543 B1 * | 11/2003 | Osgoodby .................... 600/549 |
| 6,688,766 B2 * | 2/2004 | Gant et al. ................... 378/169 |
| 2002/0067801 A1 * | 6/2002 | Gomez ....................... 378/169 |

* cited by examiner

Primary Examiner—Edward J. Glick
Assistant Examiner—Allen C. Ho

(57) ABSTRACT

A gel covered dental film for bettering the flavor of x-ray film includes an x-ray film slide having a first side edge, second side edge, an upper edge, and a lower edge. A gripping member is attached to the lower edge of the slide. A sleeve is extended over and is attached to the gripping member. The lower edge of the film is positionable in the sleeve when the gripping member and film are generally co-planar. A flavored gel is positioned on and generally coats the gripping member.

5 Claims, 2 Drawing Sheets

GEL COVERED DENTAL FILM

BACKGROUND OF THE INVENTION

1. Field of the Invention

The present invention relates to dental x-ray film and more particularly pertains to a new dental x-ray film for bettering the flavor of x-ray film.

2. Description of the Prior Art

The use of dental x-ray film is known in the prior art as are flavoring devices. U.S. Pat. No. 6,231,957 describes a flavored wafer which disintegrates while imparting a flavor to a food. Another type of flavoring device is U.S. Pat. No. 5,202,707 comprising a flavored boot for eyeglasses. A dental X-ray film is U.S. Des. Pat. No. 415,566, which includes an illustration of cushioned X-ray film. Another dental X-ray film is U.S. Pat. No. 4,922,511 for a packet to give comfort to the mouth of a patient.

While these devices fulfill their respective, particular objectives and requirements, the need remains for a device that includes a flavor for hiding the cardboard taste of the typical X-ray film while at the same time having rounded corners to protect the gums of the patient.

SUMMARY OF THE INVENTION

The present invention meets the needs presented above by providing a flavored gel positioned on the tooth-gripping member of dental X-ray film so that the patient tastes the gel and not the film.

Still yet another object of the present invention is to provide a new dental x-ray film that has rounded corners to prevent irritation of the gums when the device is positioned in the mouth.

To this end, the present invention generally comprises an x-ray film slide having a first side edge, second side edge, an upper edge, and a lower edge. A gripping member is attached to the lower edge of the slide. A sleeve is extended over and is attached to the gripping member. The lower edge of the film is positionable in the sleeve when the gripping member and film are generally co-planar. A flavored gel is positioned on and generally coats the gripping member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
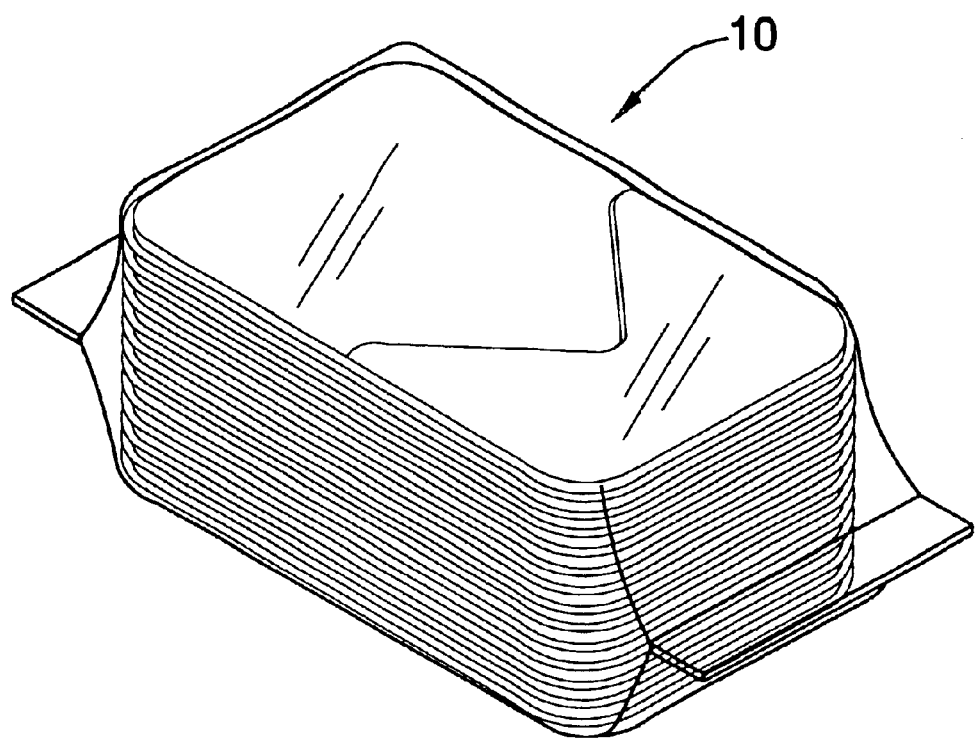
FIG. 1 is a schematic perspective view of a plurality of to packaged gel covered dental films according to the present invention.
Figure 2:
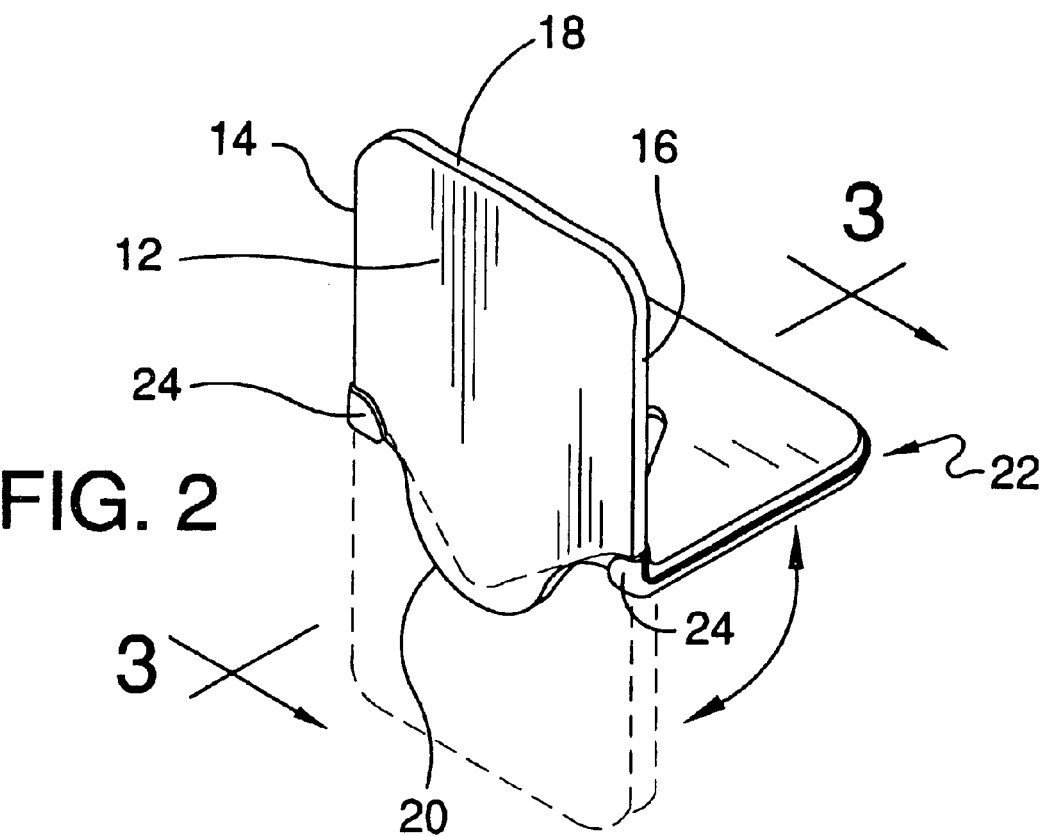
FIG. 2 is a schematic perspective view of the present invention.
Figure 3:
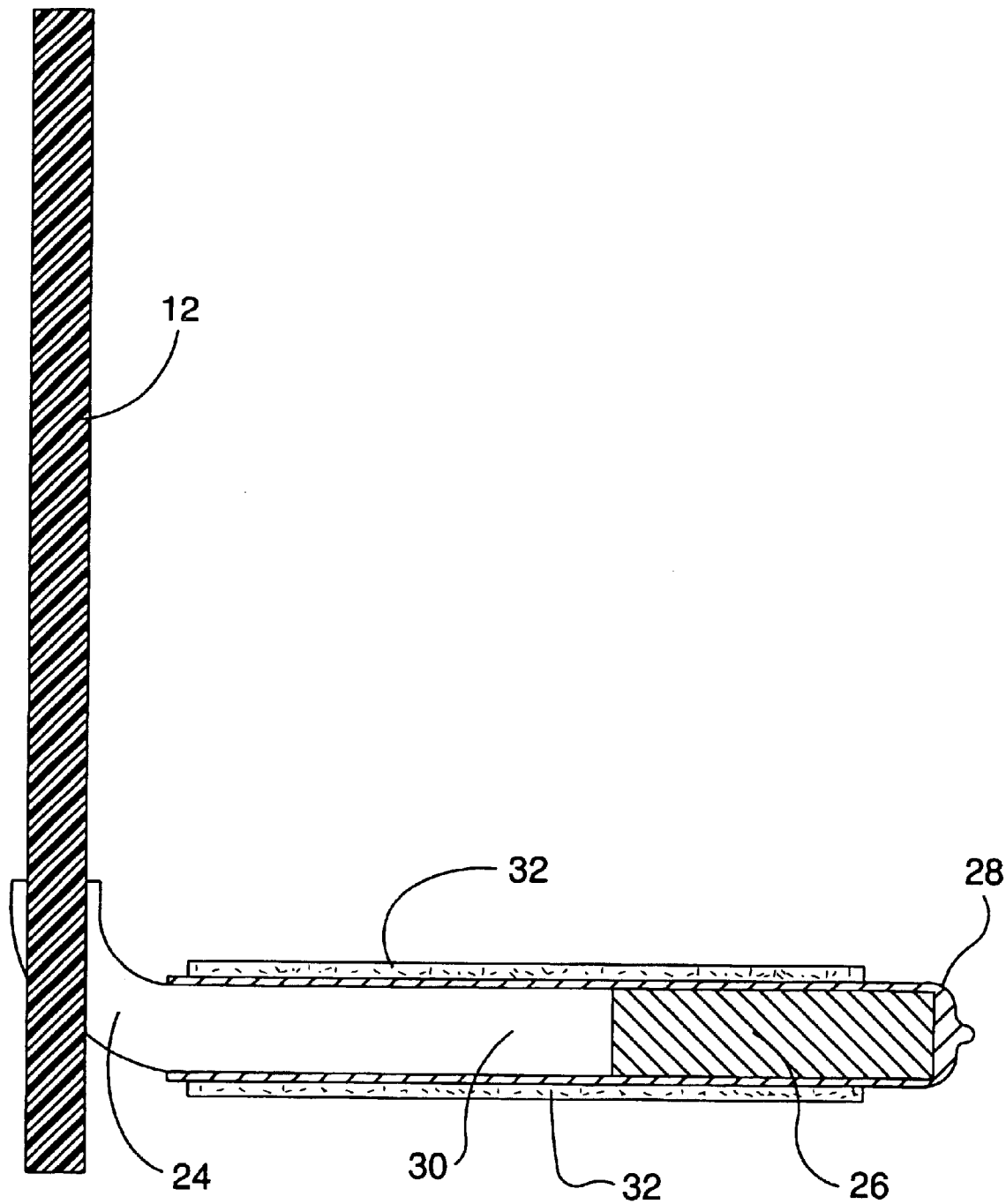
FIG. 3 is a schematic cross-sectional view taken along line 3—3 of FIG. 2 of the present invention.

With reference now to the drawings, and in particular to FIGS. 1 through 3 thereof, a new dental x-ray film embodying the principles and concepts of the present invention and generally designated by the reference numeral 10 will be described.

As best illustrated in FIGS. 1 through 3, the gel covered dental film 10 generally comprises a conventional x-ray film slide 12 typically used for taking X-ray photographs of teeth and has a first side edge 14, second side edge 16, an upper edge 18, and a lower edge 20. The lower edge 20 is rounded such that it extends away from the upper edge 18. A juncture of the first 14 and second 16 side edges and the upper edge 18 is rounded. The rounded corners of the slide 12 ensure that it will not cut or otherwise aggravate the gums of patient who has the device in their mouth.

A gripping member 22 is attached to the lower edge of the slide 12. The gripping member 22 includes a pair of legs 24 attached to the lower edge. Each of the legs 24 is positioned adjacent to one of the first 14 and second 16 side edges. A central portion 26 is attached to the legs 24. The device is bendable al the juncture of the legs 24 and slide 12 so that the gripping member 22 may be moved into a plane orientated generally perpendicular to the slide 12. In that position, the gripping member 22 may be bitten down on so that the slide 12 is adjacent to the chosen teeth and gums. A sleeve 28 extends over and is attached to the gripping member 22 and has an opening facing the slide 12. The lower edge of the film is positionable in the sleeve 28 when the gripping member 22 and film 30 are generally co-planar. The sleeve 28 helps to keep the device in a planar configuration for positioning in packaging as shown in FIG. 1.

A gel 32 is positioned on an outer surface of the sleeve 28 for generally coating the gripping member 22. The gel 32 is flavored and preferably also includes fluoride. The gel 32 may be flavored any conventional flavor such as lemon, mint, cherry, strawberry, bubble gum, pina-colada or other such flavors. The flavor chosen may depend on the person for whom it is meant, such as bubble gum for a child. Additionally, it is desirable to offer the device in a plurality of sizes for the accommodation of different sized mouths. The gel 32 can be any conventional gel used for food preparations.

In use, the device is used as a conventional X-ray slide for taking dental X-ray photographs. The improvement lies in two areas. First, the corners and lower edge are rounded to help prevent discomfort to the gums. The second is in the flavored gel 32, which is positioned on the gripping member. The gel 32 makes the experience more pleasing for the patient, especially children, and will lessen the choking or gagging which can be associated with the conventional film slides having a cardboard taste.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flavored dental film device comprising:

an x-ray film slide having a first side edge, second side edge, an upper edge, and a lower edge;

a gripping member being attached to said lower edge of said slide, a sleeve being extended over and being attached to said gripping member, said lower edge of said film being positionable in said sleeve when said gripping member and film are generally co-planar; and a gel being positioned on and generally coating said gripping member, said gel being flavored.

2. The flavored dental film device as in claim 1, wherein said lower edge of said slide rounded such that it extends away from said upper edge.

3. The flavored dental film device as in claim 2, wherein a juncture of said first and second side edges and said upper edge are rounded.

4. The flavored dental film device as in claim 1, wherein said gripping member includes a pair of legs attached to said lower edge, each of said legs being positioned adjacent to one of said first and second side edges, a central portion being attached to said legs.

5. A flavored dental film device comprising:

an x-ray film slide having a first side edge, second side edge, an upper edge, and a lower edge, said lower edge being rounded such that it extends away from said upper edge, a juncture of said first and second side edges and said upper edge being rounded;

a gripping member being attached to said lower edge of said slide, said gripping member including a pair of legs attached to said lower edge, each of said legs being positioned adjacent to one of said first and second side edges, a central portion being attached to said legs, a sleeve being extended over and being attached to said gripping member, said lower edge of said film being positionable in said sleeve when said gripping member and film are generally co-planar;

a gel being positioned on and generally coating said gripping member, said gel being flavored.

* * * * *